(12) United States Patent
Morgan et al.

(10) Patent No.: US 12,098,644 B2
(45) Date of Patent: Sep. 24, 2024

(54) TURBOSHAFT GAS TURBINE ENGINE

(71) Applicant: PRATT & WHITNEY CANADA CORP., Longueuil (CA)

(72) Inventors: Keith Morgan, Westmount (CA); Eric Durocher, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/056,032

(22) Filed: Nov. 16, 2022

(65) Prior Publication Data

US 2023/0075494 A1 Mar. 9, 2023

Related U.S. Application Data

(63) Continuation of application No. 16/535,397, filed on Aug. 8, 2019, now Pat. No. 11,536,153.

(Continued)

(51) Int. Cl.
*F02C 3/08* (2006.01)
*B64C 27/12* (2006.01)
(Continued)

(52) U.S. Cl.
CPC ............. *F01D 13/02* (2013.01); *B64C 27/12* (2013.01); *B64D 27/10* (2013.01); *B64D 35/04* (2013.01);
(Continued)

(58) Field of Classification Search
None
See application file for complete search history.

(56) References Cited

U.S. PATENT DOCUMENTS 2,548,975 A 4/1951 Hawthorne
2,747,367 A 5/1956 Savin
(Continued)

FOREIGN PATENT DOCUMENTS

CA 2562290 10/2013
CA 2970386 1/2018
(Continued)

OTHER PUBLICATIONS

A New Approach to Turboshaft Engine Growth, M. A. Compagnon, General Electric Company, Lynn,Massachusetts pp. 80-41-1 to 80-41-6, May 13, 1980.

(Continued)

*Primary Examiner* — Kayla Mccaffrey
(74) *Attorney, Agent, or Firm* — NORTON ROSE FULBRIGHT CANADA LLP (57) ABSTRACT

A turboshaft engine for a rotorcraft includes a first spool and an independently rotatable second spool. The first spool includes a low pressure compressor, a first set of variable guide vanes disposed at an entry of the low pressure compressor, and a low pressure turbine drivingly engaged to the low pressure compressor. The second spool includes a high pressure compressor, a second set of variable guide vanes disposed at an entry of the high pressure compressor, the second set of variable guide vanes independently operable relative to the first set of variable guide vanes, and a high pressure turbine drivingly engaged to the high pressure compressor. One or both of the low pressure compressor and the high pressure compressor includes a mixed flow rotor.

20 Claims, 6 Drawing Sheets

Related U.S. Application Data (60) Provisional application No. 62/715,917, filed on Aug. 8, 2018.

(51) Int. Cl.
*B64D 27/10* (2006.01)
*B64D 35/04* (2006.01)
*F01D 13/02* (2006.01)
*F01D 15/12* (2006.01)
*F01D 17/16* (2006.01)
*F02C 6/02* (2006.01)
*F02C 6/20* (2006.01)
*F02C 7/36* (2006.01)
*F02C 9/56* (2006.01)

(52) U.S. Cl.
CPC ........... *F01D 15/12* (2013.01); *F01D 17/162* (2013.01); *F02C 6/02* (2013.01); *F02C 6/20* (2013.01); *F02C 7/36* (2013.01); *F02C 9/56* (2013.01); *F05D 2220/329* (2013.01); *F05D 2240/12* (2013.01); *F05D 2240/60* (2013.01); *F05D 2260/4031* (2013.01)

(56) References Cited

U.S. PATENT DOCUMENTS

| | | | |
|---|---|---|---|
| 2,929,207 | A | 3/1960 | Peterson |
| 2,955,424 | A | 10/1960 | Hryniszak |
| 2,984,977 | A | 5/1961 | Embree |
| 3,152,443 | A | 10/1964 | Newland |
| 3,170,292 | A | 2/1965 | Howes |
| 3,204,406 | A | 9/1965 | Howes |
| 3,209,536 | A | 10/1965 | Howes |
| 3,255,825 | A | 6/1966 | Mouille et al. |
| 3,488,947 | A | 1/1970 | Miller et al. |
| 3,529,419 | A | 9/1970 | Reed |
| 3,762,161 | A | 10/1973 | Pennig |
| 3,874,811 | A | 4/1975 | Dennison |
| 4,055,949 | A | 11/1977 | Snecma |
| 4,141,212 | A | 2/1979 | Koschier |
| 4,251,987 | A | 2/1981 | Adamson |
| 4,252,498 | A | 2/1981 | Radcliffe et al. |
| 4,498,291 | A | 2/1985 | Jefferey |
| 4,531,694 | A | 7/1985 | Soloy |
| 4,611,464 | A | 9/1986 | Hetzer et al. |
| 4,678,398 | A | 7/1987 | Dodge et al. |
| 4,685,286 | A | 8/1987 | Hetzer et al. |
| 4,817,382 | A | 4/1989 | Rudolph et al. |
| 4,864,812 | A | 9/1989 | Rodgers |
| 5,159,808 | A | 11/1992 | Kast |
| 5,161,364 | A | 11/1992 | Bruun et al. |
| 5,309,708 | A | 5/1994 | Stewart |
| 6,041,589 | A | 3/2000 | Giffin, III et al. |
| 6,082,967 | A | 7/2000 | Loisy |
| 6,247,668 | B1 | 6/2001 | Reysa et al. |
| 6,488,469 | B1* | 12/2002 | Youssef ............. F04D 17/122 415/181 |
| 6,855,089 | B2 | 2/2005 | Poulin |
| 6,865,891 | B2 | 3/2005 | Walsh et al. |
| 6,895,741 | B2 | 5/2005 | Rago et al. |
| 7,055,303 | B2 | 6/2006 | Macfarlane et al. |
| 7,168,913 | B2 | 1/2007 | Lardellier |
| 7,500,365 | B2 | 3/2009 | Suciu et al. |
| 7,552,591 | B2 | 6/2009 | Bart et al. |
| 7,690,185 | B2 | 4/2010 | Linet et al. |
| 7,707,909 | B2 | 5/2010 | Linet et al. |
| 7,762,084 | B2 | 7/2010 | Martis |
| 8,176,725 | B2 | 5/2012 | Norris et al. |
| 8,209,952 | B2 | 7/2012 | Ress, Jr. |
| 8,210,800 | B2* | 7/2012 | Suciu ............. F02C 9/20 415/149.4 |
| 8,220,245 | B1 | 7/2012 | Papandreas |
| 8,231,341 | B2 | 7/2012 | Anderson et al. |
| 8,459,038 | B1 | 6/2013 | Lickfold et al. |
| 8,516,789 | B2 | 8/2013 | Kupratis |
| 8,568,089 | B2 | 10/2013 | Lemmers, Jr. et al. |
| 8,621,871 | B2 | 1/2014 | McCune et al. |
| 8,794,922 | B2 | 8/2014 | Bart et al. |
| 8,853,878 | B1 | 10/2014 | White |
| 9,062,611 | B2 | 6/2015 | Sheridan |
| 9,126,691 | B2 | 9/2015 | Cloft |
| 9,145,834 | B2 | 9/2015 | Frost et al. |
| 9,239,004 | B2 | 1/2016 | Kupratis et al. |
| 9,322,341 | B2 | 4/2016 | Belleville |
| 9,328,667 | B2 | 5/2016 | MacFarlane |
| 9,341,121 | B2 | 5/2016 | Kupratis |
| 9,353,848 | B2 | 5/2016 | Blewett et al. |
| 9,366,260 | B2 | 6/2016 | Bradbrook et al. |
| 9,500,138 | B1 | 11/2016 | Cai et al. |
| 9,512,784 | B2 | 12/2016 | Morgan et al. |
| 9,719,465 | B2 | 8/2017 | Suciu et al. |
| 9,745,860 | B1 | 8/2017 | Haskin |
| 9,752,500 | B2 | 9/2017 | Ullyott et al. |
| 9,784,182 | B2 | 10/2017 | Dhanuka |
| 9,819,292 | B2 | 11/2017 | Thatcher |
| 9,828,911 | B2 | 11/2017 | Burghardt |
| 9,869,250 | B2 | 1/2018 | Hanrahan et al. |
| 9,890,704 | B2 | 2/2018 | Speak et al. |
| 9,926,849 | B2 | 3/2018 | Frost et al. |
| 9,932,858 | B2 | 4/2018 | Miller |
| 10,054,001 | B2 | 8/2018 | Beutin et al. |
| 10,072,570 | B2 | 9/2018 | Kupratis |
| 10,094,295 | B2 | 10/2018 | Ullyott et al. |
| 10,125,722 | B2 | 11/2018 | Kupratis et al. |
| 10,598,181 | B2 | 3/2020 | Sung |
| 2002/0061249 | A1 | 5/2002 | Caubet et al. |
| 2003/0066294 | A1* | 4/2003 | Mannarino ......... F04D 27/0246 60/773 |
| 2005/0002781 | A1 | 1/2005 | Tonks |
| 2005/0060983 | A1 | 3/2005 | Lardellier |
| 2006/0010152 | A1 | 1/2006 | Catalano |
| 2006/0137355 | A1 | 6/2006 | Welch et al. |
| 2006/0185346 | A1 | 8/2006 | Rolt |
| 2007/0240427 | A1 | 10/2007 | Ullyott |
| 2008/0081733 | A1 | 4/2008 | Hattenbach |
| 2008/0138195 | A1 | 6/2008 | Kern |
| 2008/0148881 | A1 | 6/2008 | Moniz et al. |
| 2009/0015011 | A1 | 1/2009 | Colin |
| 2009/0188334 | A1 | 7/2009 | Merry |
| 2009/0288421 | A1 | 11/2009 | Zeiner |
| 2009/0322088 | A1 | 12/2009 | Dooley |
| 2010/0164234 | A1 | 7/2010 | Bowman |
| 2010/0180568 | A1 | 7/2010 | Sachs |
| 2010/0212285 | A1 | 8/2010 | Negulescu |
| 2010/0281875 | A1 | 11/2010 | Price |
| 2010/0287907 | A1* | 11/2010 | Agrawal ............ F02C 7/052 60/39.24 |
| 2011/0056208 | A1 | 3/2011 | Norris |
| 2011/0171030 | A1 | 7/2011 | Swift |
| 2011/0185738 | A1 | 8/2011 | Bastnagel et al. |
| 2011/0284328 | A1 | 11/2011 | Brandt |
| 2013/0031912 | A1 | 2/2013 | Finney |
| 2013/0056982 | A1 | 3/2013 | Gozdawa |
| 2013/0098066 | A1 | 4/2013 | Gallet et al. |
| 2013/0139518 | A1 | 6/2013 | Morgan |
| 2013/0145769 | A1 | 6/2013 | Norris et al. |
| 2013/0018605 | A1 | 7/2013 | Sheridan et al. |
| 2013/0186058 | A1 | 7/2013 | Sheridan et al. |
| 2013/0255224 | A1 | 10/2013 | Kupratis |
| 2014/0069107 | A1 | 3/2014 | Macfarlane |
| 2014/0130352 | A1 | 5/2014 | Buldtmann et al. |
| 2014/0150401 | A1 | 6/2014 | Venter |
| 2014/0250862 | A1 | 9/2014 | Suciu et al. |
| 2014/0252160 | A1 | 9/2014 | Suciu et al. |
| 2014/0255147 | A1 | 9/2014 | Root |
| 2014/0256494 | A1 | 9/2014 | Lewis |
| 2014/0260295 | A1 | 9/2014 | Ullyott et al. |
| 2014/0260573 | A1 | 9/2014 | Spanos et al. |
| 2014/0290265 | A1 | 10/2014 | Ullyott et al. |
| 2014/0297155 | A1 | 10/2014 | Chen |
| 2015/0013307 | A1 | 1/2015 | Burghardt |
| 2015/0081193 | A1 | 3/2015 | Gordon et al. |
| 2015/0113996 | A1 | 4/2015 | Cai et al. |

(56) References Cited

U.S. PATENT DOCUMENTS

| | | |
|---|---|---|
| 2015/0150401 A1 | 6/2015 | Bennett |
| 2015/0167549 A1 | 6/2015 | Ribarov et al. |
| 2015/0233302 A1 | 8/2015 | Levasseur et al. |
| 2015/0337738 A1 | 11/2015 | Suciu et al. |
| 2015/0354453 A1 | 12/2015 | Hanrahan et al. |
| 2015/0369123 A1 | 12/2015 | Hanrahan |
| 2015/0377125 A1 | 12/2015 | Kupratis et al. |
| 2016/0040601 A1 | 2/2016 | Frost et al. |
| 2016/0090871 A1 | 3/2016 | Olsen |
| 2016/0169118 A1 | 6/2016 | Duong |
| 2016/0201490 A1 | 7/2016 | Scott |
| 2016/0201684 A1 | 7/2016 | Schwarz et al. |
| 2016/0208690 A1 | 7/2016 | Zimmitti |
| 2016/0215694 A1 | 7/2016 | Brostmeyer |
| 2016/0230843 A1 | 8/2016 | Duong et al. |
| 2016/0245185 A1 | 8/2016 | Lamarre et al. |
| 2016/0290226 A1 | 10/2016 | Roberge |
| 2016/0305261 A1 | 10/2016 | Orosa |
| 2016/0319845 A1 | 11/2016 | Molnar |
| 2016/0333782 A1 | 11/2016 | Morgan |
| 2016/0333791 A1 | 11/2016 | Snyder et al. |
| 2016/0341214 A1 | 11/2016 | O'Toole |
| 2017/0016399 A1 | 1/2017 | Bedrine et al. |
| 2017/0108084 A1 | 4/2017 | Chmylkowski |
| 2017/0122122 A1 | 5/2017 | Lepretre |
| 2017/0152055 A1 | 6/2017 | Mercier-Calvairac et al. |
| 2017/0211477 A1 | 7/2017 | Menheere |
| 2017/0211484 A1 | 7/2017 | Sheridan |
| 2017/0191413 A1 | 8/2017 | Haskin |
| 2017/0247114 A1 | 8/2017 | Moulon et al. |
| 2017/0305541 A1 | 10/2017 | Vallart et al. |
| 2017/0306841 A1 | 10/2017 | Skertic |
| 2017/0314469 A1 | 11/2017 | Roever |
| 2017/0314474 A1 | 11/2017 | Wotzak |
| 2017/0327241 A1 | 11/2017 | Mitrovic |
| 2017/0356347 A1 | 12/2017 | Scothern et al. |
| 2017/0356452 A1 | 12/2017 | Mastro |
| 2017/0370284 A1 | 12/2017 | Harvey et al. |
| 2018/0016989 A1 | 1/2018 | Abe et al. |
| 2018/0023480 A1 | 1/2018 | Lefebvre |
| 2018/0023481 A1 | 1/2018 | Lefebvre |
| 2018/0023482 A1 | 1/2018 | Lefebvre |
| 2018/0045068 A1 | 2/2018 | Brinson et al. |
| 2018/0058330 A1 | 3/2018 | Munevar |
| 2018/0073428 A1 | 3/2018 | Morgan |
| 2018/0073429 A1 | 3/2018 | Dubreuil |
| 2018/0073438 A1 | 3/2018 | Durocher et al. |
| 2018/0080378 A1 | 3/2018 | Alecu |
| 2018/0135522 A1 | 5/2018 | Mitrovic et al. |
| 2018/0149091 A1 | 5/2018 | Howell et al. |
| 2018/0163640 A1 | 6/2018 | Dubreuil et al. |
| 2018/0171815 A1 | 6/2018 | Suciu et al. |
| 2018/0172012 A1 | 6/2018 | Plante et al. |
| 2018/0187604 A1 | 7/2018 | Poumarede et al. |
| 2018/0202310 A1 | 7/2018 | Suciu et al. |
| 2018/0202368 A1 | 7/2018 | Suciu et al. |
| 2018/0208322 A1 | 7/2018 | Tantot |
| 2018/0216525 A1 | 8/2018 | Plante et al. |
| 2018/0223739 A1 | 8/2018 | Dubreuil et al. |
| 2018/0283281 A1 | 10/2018 | Veilleux, Jr. et al. |
| 2018/0291817 A1 | 10/2018 | Suciu et al. |
| 2018/0313274 A1 | 11/2018 | Suciu et al. |
| 2018/0347471 A1 | 12/2018 | Wotzak |

FOREIGN PATENT DOCUMENTS

| | | |
|---|---|---|
| CA | 2970389 | 1/2018 |
| CA | 2975558 | 6/2018 |
| EP | 0103370 | 3/1984 |
| EP | 0860593 | 9/2003 |
| EP | 1908938 | 4/2004 |
| EP | 2226487 | 9/2010 |
| EP | 2295763 | 3/2011 |
| EP | 2320067 | 5/2011 |
| EP | 1959114 | 5/2012 |
| EP | 2728140 | 5/2014 |
| EP | 3043056 | 7/2016 |
| EP | 3273031 | 1/2018 |
| EP | 3273034 | 1/2018 |
| EP | 3273032 | 4/2018 |
| EP | 3309371 | 4/2018 |
| FR | 991975 | 10/1951 |
| FR | 1262452 | 5/1961 |
| FR | 1594317 | 6/1970 |
| FR | 3001525 | 8/2014 |
| GB | 713839 | 8/1954 |
| GB | 794198 | 4/1958 |
| GB | 1102591 | 2/1968 |
| WO | 95/02120 A1 | 1/1995 |
| WO | 2005/061873 | 7/2005 |
| WO | 2008045068 | 4/2008 |
| WO | 2015033336 | 3/2015 |
| WO | 2015122948 | 8/2015 |
| WO | 20150122948 | 8/2015 |
| WO | 2017/198999 | 11/2017 |

OTHER PUBLICATIONS

Veres, Joseph. A Madel to Assess the Risk of Ice Accretion due to Ice Crystal Ingestion in a Turbofan Engine and its Effects on Performance, Jun. 2012, 4th AIAA Atmospheric and Space Environments Conference, AIAA 2012-3038. (Year: 2012).

* cited by examiner

TURBOSHAFT GAS TURBINE ENGINE

CROSS-REFERENCE TO RELATED APPLICATION

The present application is a continuation of U.S. patent application Ser. No. 16/535,397 filed on Aug. 8, 2019, which claims priority to U.S. Patent Application No. 62/715,917 filed Aug. 8, 2018, the entire content of each of which is incorporated herein by reference.

TECHNICAL FIELD

The present disclosure relates to turboshaft gas turbine engines.

BACKGROUND

Multi-engine helicopters are often provided with two or more gas turbine turboshaft engines connected to a main rotor via a common gearbox, and each of the engines is sized to provide power greater than what is required for cruising using both/all engines. During normal cruise operating regimes, both engines typically operate at similar power output levels (e.g. each engine provides 50% of the total power output). Attempts have however been made to operate the engines asymmetrically, that is, operating one engine at a higher power than the other. Doing so can provide overall better fuel efficiency, owing to the fact that gas turbine engines are typically optimized to run most efficiently at high power. However, the engine operating at lower power needs to be able to rapidly speed back up, when called upon. While such systems are known, improvements are desirable.

SUMMARY

In one aspect, there is provided a multi-engine system comprising: a first turboshaft engine and a second turboshaft engine driving a common reduction gearbox that is configured to drive a common load, the second turboshaft engine configured to operate in a standby mode, at least the second turboshaft engine comprising: at least two spools independently rotatable relative to each other, a low pressure spool of the at least two spools including a low pressure shaft interconnecting a low pressure compressor section to a low pressure turbine section, and a high pressure spool of the at least two spools including a high pressure shaft interconnecting a high pressure compressor section to a high pressure turbine section; a first set of variable guide vanes disposed at an inlet of the low pressure compressor section, the first set of variable guide vanes controlling an operating condition of the low pressure spool; and a second set of variable guide vanes disposed at an inlet of the high pressure compressor section, the second set of variable guide vanes controlling an operating condition of the high pressure spool.

In another aspect, there is provided a turboshaft engine for a multi-engine system configured to drive a common load, the turboshaft comprising: at least two spools independently rotatable relative to each other, a low pressure spool of the at least two spools including a low pressure shaft interconnecting a low pressure compressor section to a low pressure turbine section, and a high pressure spool of the at least two spools including a high pressure shaft interconnecting a high pressure compressor section to a high pressure turbine section; a set of variable guide vanes disposed at an inlet of each one of the at least two spools, the set of variable guide vanes configured to control an operating condition of a corresponding spool of the at least two spools; and an output shaft drivingly engaged to the low pressure shaft and configured to drivingly engage a common output shaft, the common output shaft driving the common load and being drivingly engaged by another turboshaft engine.

In a further aspect, there is provided a method of operating a multi-engine system drivingly coupled to a load, the method comprising: operating a first turboshaft engine of the multi-engine system to drive the load while a second turboshaft engine of the multi-engine system is operating in a reduced power mode; increasing an output power level of the second turboshaft engine to drive the load by: directing an airflow through a first set of variable guide vanes of the second turboshaft engine; compressing the airflow through a low pressure compressor section; directing the airflow through a second set of variable guide vanes; and compressing the airflow through a high pressure compressor section, the low pressure compressor section and the high pressure compressor section independently rotate relative to each other.

In another aspect, there is provided a method of operating a multi-engine helicopter, comprising: using full authority digital control (FADEC), controlling a first engine of the multi-engine helicopter to operate in an active mode that includes satisfying a power or rotor speed demand of the multi-engine helicopter to execute a cruise flight segment by the multi-engine helicopter; and using the FADEC, controlling a second engine of the multi-engine helicopter to maintain a fuel flow rate difference between the first and second engines to be in a range of 70% to 99.5%.

In some embodiments, the controlling the second engine is performed to maintain the fuel flow rate difference a range of 70% to 90%.

In some embodiments, the controlling the second engine is performed to maintain the fuel flow rate difference a range of 80% to 90%.

In some embodiments, the controlling the second engine is performed by using a rate of fuel flow through the second engine as a control input variable to the second engine, and the controlling the first engine is performed by using the power or rotor speed demand as a control input variable to the first engine.

In some embodiments, the controlling the first engine to operate in the active mode includes controlling the first engine to drive a rotor of the multi-engine helicopter via a gearbox of the multi-engine helicopter and controlling the second engine includes decoupling the second engine from the gearbox.

In some embodiments, the controlling the first engine to operate in the active mode includes controlling the first engine to drive a rotor of the multi-engine helicopter via a gearbox of the multi-engine helicopter and controlling the fuel flow rate difference so as to drive the gearbox with the second engine at a power in a range of 0% to 1% of a rated full-power of the second engine.

In some embodiments, method comprises modulating a first set of VGVs upstream of a low pressure compressor section of the first engine between an 80 degree position and a −25 degree position independently of a position of a second set of VGVs upstream of a high pressure compressor section of the first engine.

In some embodiments, method comprises performing at least one of: a) controlling the low pressure compressor section of the second engine to maintain a pressure ratio associated with the low pressure compressor section of the second engine between 0.9 to 1.4, and b) controlling a fuel flow through the second engine to be in a range of about 20% to 10% of a simultaneous fuel flow through the first engine.

In another aspect, there is provided a multi-engine system comprising: a first turboshaft engine and a second turboshaft engine driving a common gearbox that is configured to drive a load, at least the second turboshaft engine comprising: at least two spools independently rotatable relative to each other, a low pressure spool of the at least two spools including a low pressure shaft interconnecting a low pressure compressor section to a low pressure turbine section, and a high pressure spool of the at least two spools including a high pressure shaft interconnecting a high pressure compressor section to a high pressure turbine section; a first set of variable guide vanes disposed upstream of the low pressure compressor section; and a second set of variable guide vanes disposed upstream of the high pressure compressor section, the first set of variable guide vanes being decoupled from the second set of variable guide vanes, and the low pressure compressor section including a mixed flow rotor.

In some such embodiments, the first set of variable guide vanes is operable between an 80 degree position and a −25 degree position and the second set of variable guide vanes is operable between an 80 degree position and a −25 degree position.

In some such embodiments, the first set of variable guide vanes is operable between the 80 degree position and the −25 degree position associated with the first set of variable guide vanes while the second set of variable guide vanes is maintained in a given position.

In some such embodiments, the multi-engine system comprises an intermediate pressure spool of the at least two spools including an intermediate pressure shaft interconnecting an intermediate pressure compressor section to an intermediate pressure turbine section, and a third set of variable guide vanes disposed at an inlet of the intermediate pressure compressor section, the third set of variable guide vanes controlling an operating condition of the intermediate pressure spool.

In another aspect, there is provided a turboshaft engine for a multi-engine system configured to drive a common load, the turboshaft comprising: at least two spools independently rotatable relative to each other, a low pressure spool of the at least two spools including a low pressure shaft interconnecting a low pressure compressor section to a low pressure turbine section, and a high pressure spool of the at least two spools including a high pressure shaft interconnecting a high pressure compressor section to a high pressure turbine section, the low pressure compressor section being defined by a single mixed flow rotor; and a plurality of sets of variable guide vanes comprising a set of variable guide vanes disposed at an inlet of each one of the at least two spools, a first set of the plurality of sets being mechanically decoupled from a second set of the plurality of sets.

In some such embodiments, the first set of variable guide vanes is operable between an 80 degree position and a −25 degree position associated with the first set of variable guide vanes.

In some such embodiments, the second set of variable guide vanes is operable between an 80 degree position and a −25 degree position associated with the second set of variable guide vanes.

In some such embodiments, the first set of variable guide vanes is operable between the 80 degree position and the −25 degree position associated with the first set of variable guide vanes while the second set of variable guide vanes is maintained in a given position.

In some such embodiments, the high pressure turbine section includes only a single turbine stage.

In some such embodiments, the turboshaft engine comprises an intermediate pressure spool of the at least two spools including an intermediate pressure shaft interconnecting an intermediate pressure compressor section to an intermediate pressure turbine section.

In some such embodiments, the first set of variable guide vanes is disposed upstream of the low pressure compressor section.

In some such embodiments, the second set of variable guide vanes is disposed upstream of the high pressure compressor section.

In another aspect, there is provided a method of operating a multi-engine system of a rotorcraft, comprising: during a cruise flight segment of the rotorcraft, controlling a first engine to provide sufficient power and/or rotor speed demands of the cruise flight segment; and controlling a second engine to provide a fuel flow to the second engine that is between 70% and 99.5% less than a fuel flow provided to the first engine.

In some embodiments, the fuel flow to the second engine is between 70% to 90% less than a fuel flow provided to the first engine.

In some embodiments, the fuel flow to the second engine is between 80% to 90% less than a fuel flow provided to the first engine.

In some embodiments, the step of controlling the second engine includes using the fuel flow rate to the second engine as a control input variable to a controller of the multi-engine system.

In some embodiments, the method further comprises a step of decoupling the second engine from the gearbox.

In some embodiments, the step of controlling the first engine is performed by using the power or rotor speed demand as a control input variable to the first engine and includes driving a rotor of the multi-engine rotorcraft via a common gearbox, and the step of controlling the second engine includes controlling the fuel flow rate to the second engine so that a power output of the second engine to the common gearbox remains between 0% to 1% of a rated full-power of the second engine.

In some embodiments, the method further comprises modulating a set of variable guide vanes (VGVs) upstream of a low pressure compressor of the second engine.

In some embodiments, the modulating the set of VGVs upstream of the low pressure compressor of the second engine is between a +80 degree position and a −25 degree position, and further comprising modulating a second set of VGVs upstream of a high pressure compressor of the second engine.

In some embodiments, the method further comprises controlling the low pressure compressor of the second engine to maintain a pressure ratio associated with the low pressure compressor of the second engine between 0.9 to 2.5.

In some embodiments, the method further comprises controlling a fuel flow to the second engine between 20% and 10% of a reference fuel flow to the second engine.

In another aspect, there is provided a multi-engine system for a rotorcraft comprising: a first turboshaft engine and a second turboshaft engine driving a common gearbox configured to drive a load, at least the second turboshaft engine having: a low pressure spool having a low pressure compressor and a low pressure turbine section, the low pressure compressor section including a mixed flow rotor, a high pressure spool having a high pressure compressor and a high pressure turbine section, the spools independently rotatable relative to one another, a set of variable guide vanes (VGVs) upstream of each of the low pressure and high pressure compressors, the VGVs configured to be independently operable relative to one another, and a controller configured to control fuel flow to the engines, including controlling the fuel flow to the second engine in a selected mode to be between 70% and 99.5% less than a fuel flow to the first engine.

In some embodiments, at least one set of the variable guide vanes is operable between an +80 degree position and a −25 degree position.

In some embodiments, the LP compressor variable guide vanes are operable between the +80 degree position and the −25 degree position.

In some embodiments, the multi-engine system further comprises an intermediate spool including an intermediate pressure compressor and an intermediate pressure turbine, and a third set of variable guide vanes disposed at an inlet of the intermediate pressure compressor, the third set of variable guide vanes operable independently of the other two set of variable guide vanes.

In another aspect, there is provided a turboshaft engine for a multi-engine system configured to drive a common load, the turboshaft comprising: at least two spools independently rotatable relative to each other, a low pressure spool of the at least two spools including a low pressure shaft interconnecting a low pressure compressor section to a low pressure turbine section, and a high pressure spool of the at least two spools including a high pressure shaft interconnecting a high pressure compressor section to a high pressure turbine section, the low pressure compressor section being defined by a single mixed flow rotor; a plurality of sets of variable guide vanes comprising a set of variable guide vanes disposed at an inlet of each one of the at least two spools, a first set of the plurality of sets being mechanically decoupled from a second set of the plurality of sets, and an engine controller configured to control fuel flow to the engine to operate the engine at a rotational speed lower than an idle speed of the engine.

In some embodiments, the first set of variable guide vanes is operable between an 80 degree position and a −25 degree position associated with the first set of variable guide vanes.

In some embodiments, the second set of variable guide vanes is operable between an 80 degree position and a −25 degree position associated with the second set of variable guide vanes.

In some embodiments, the first set of variable guide vanes is operable between the 80 degree position and the −25 degree position associated with the first set of variable guide vanes while the second set of variable guide vanes is maintained in a given position.

In some embodiments, the high pressure turbine section includes only a single turbine stage.

In some embodiments, the turboshaft engine comprises an intermediate pressure spool of the at least two spools including an intermediate pressure shaft interconnecting an intermediate pressure compressor section to an intermediate pressure turbine section.

In some embodiments, the first set of variable guide vanes is disposed upstream of the low pressure compressor section.

In some embodiments, the second set of variable guide vanes is disposed upstream of the high pressure compressor section.

There is also provided, in another aspect, a turboshaft engine for a rotorcraft, the turboshaft gas turbine engine comprising: at least two spools independently rotatable relative to each other, a low pressure spool of the at least two spools including a low pressure shaft interconnecting a low pressure compressor section to a low pressure turbine section, and a high pressure spool of the at least two spools including a high pressure shaft interconnecting a high pressure compressor section to a high pressure turbine section, the low pressure compressor section including a mixed flow rotor; and a first set of variable guide vanes disposed upstream of the low pressure compressor and a second set of variable guide vanes disposed upstream of the high pressure compressor, the first set of variable guide vanes being mechanically decoupled from the second set of variable guide vanes, whereby the first and second sets of variable guide vanes are independently operable relative to one another.

In some embodiments, the high pressure compressor includes a mixed flow rotor.

In some embodiments, the first set of variable guide vanes is operable between an 80 degree position and a −25 degree position associated with the first set of variable guide vanes.

In some embodiments, the second set of variable guide vanes is operable between an 80 degree position and a −25 degree position associated with the second set of variable guide vanes.

In some embodiments, the first set of variable guide vanes is operable between the 80 degree position and the −25 degree position associated with the first set of variable guide vanes while the second set of variable guide vanes is maintained in a given position.

In some embodiments, the high pressure turbine section includes only a single turbine stage.

In some embodiments, the low pressure compressor includes only a single mixed flow rotor.

There is further still provided, in another aspect, a the turboshaft gas turbine engine comprising: a low pressure spool having a low pressure compressor and a low pressure turbine section, the low pressure compressor section including a mixed flow rotor, a high pressure spool having a high pressure compressor and a high pressure turbine section, the spools independently rotatable relative to one another, a set of variable guide vanes (VGVs) upstream of each of the low pressure and high pressure compressors, the VGVs configured to be independently operable relative to one another.

In some embodiments, the low pressure compressor includes only a single mixed flow rotor.

In some embodiments, the high pressure compressor includes a mixed flow rotor.

In some embodiments, at least one set of the variable guide vanes is operable between an +80 degree position and a −25 degree position.

In some embodiments, the LP compressor variable guide vanes are operable between the +80 degree position and the −25 degree position.

In some embodiments, the turboshaft engine further comprises an intermediate spool including an intermediate pressure compressor and an intermediate pressure turbine, and a third set of variable guide vanes disposed at an inlet of the intermediate pressure compressor, the third set of variable guide vanes operable independently of the other two set of variable guide vanes.

In a further aspect, there is provided a turboshaft engine for a rotorcraft, the turboshaft engine comprising: a first spool having a low pressure compressor in fluid communication with an air inlet, a first set of variable guide vanes disposed at an entry of the low pressure compressor, and a low pressure turbine drivingly engaged to the low pressure compressor; a second spool independently rotatable relative to the first spool, the second spool having a high pressure compressor in fluid communication with the low pressure compressor to receive pressurized air therefrom, a second set of variable guide vanes disposed at an entry of the high pressure compressor, the second set of variable guide vanes independently operable relative to the first set of variable guide vanes, and a high pressure turbine drivingly engaged to the high pressure compressor; and an output shaft drivingly engaged to the low pressure turbine, the output drive shaft adapted to drivingly engage a rotatable load of the turboshaft engine; wherein one or both of the low pressure compressor and the high pressure compressor includes a mixed flow rotor.

In another aspect, there is provided a turboshaft engine for a rotorcraft, the turboshaft engine comprising: at least two spools independently rotatable relative to each other, a low pressure spool of the at least two spools including a low pressure shaft interconnecting a low pressure compressor section to a low pressure turbine section, and a high pressure spool of the at least two spools including a high pressure shaft interconnecting a high pressure compressor section to a high pressure turbine section, one or both of the low pressure compressor section and the high pressure compressor section including a mixed flow rotor; and means for controlling an airflow through the low pressure compressor section independently of the high pressure compressor section.

In yet a further aspect, there is also provided a method for operating a turboshaft engine for a rotorcraft, the method comprising: drawing air into a core of the turboshaft engine through a low pressure compressor section and then through a high pressure compressor section located downstream from the low pressure compressor section to provide pressurized air, the low pressure compressor section rotating independently of the high pressure compressor section, one or both of the low pressure compressor section and the high pressure compressor section including a mixed flow rotor; operating a first set of variable guide vanes disposed upstream of the low pressure compressor section; independently of operating the first set of variable guide vanes, operating a second set of variable guide vanes disposed upstream of the high pressure compressor; igniting a mixture of the pressurized air and fuel to generate combustion gases; directing the combustion gases through a high pressure turbine section and then through a low pressure turbine section to drive the high pressure turbine section and the low pressure turbine section using the combustion gases; driving the high pressure compressor section with the high pressure turbine section; and driving the low pressure compressor section and a rotatable load with the low pressure turbine section, the low pressure turbine section and the high pressure turbine section rotating independently from one another.

BRIEF DESCRIPTION OF THE DRAWINGS

Reference is now made to the accompanying figures in which.

DETAILED DESCRIPTION

To maintain clarity of this description, some of the same reference numerals have been used in different embodiments to show features that may be common to the different embodiments.

Figure 1:
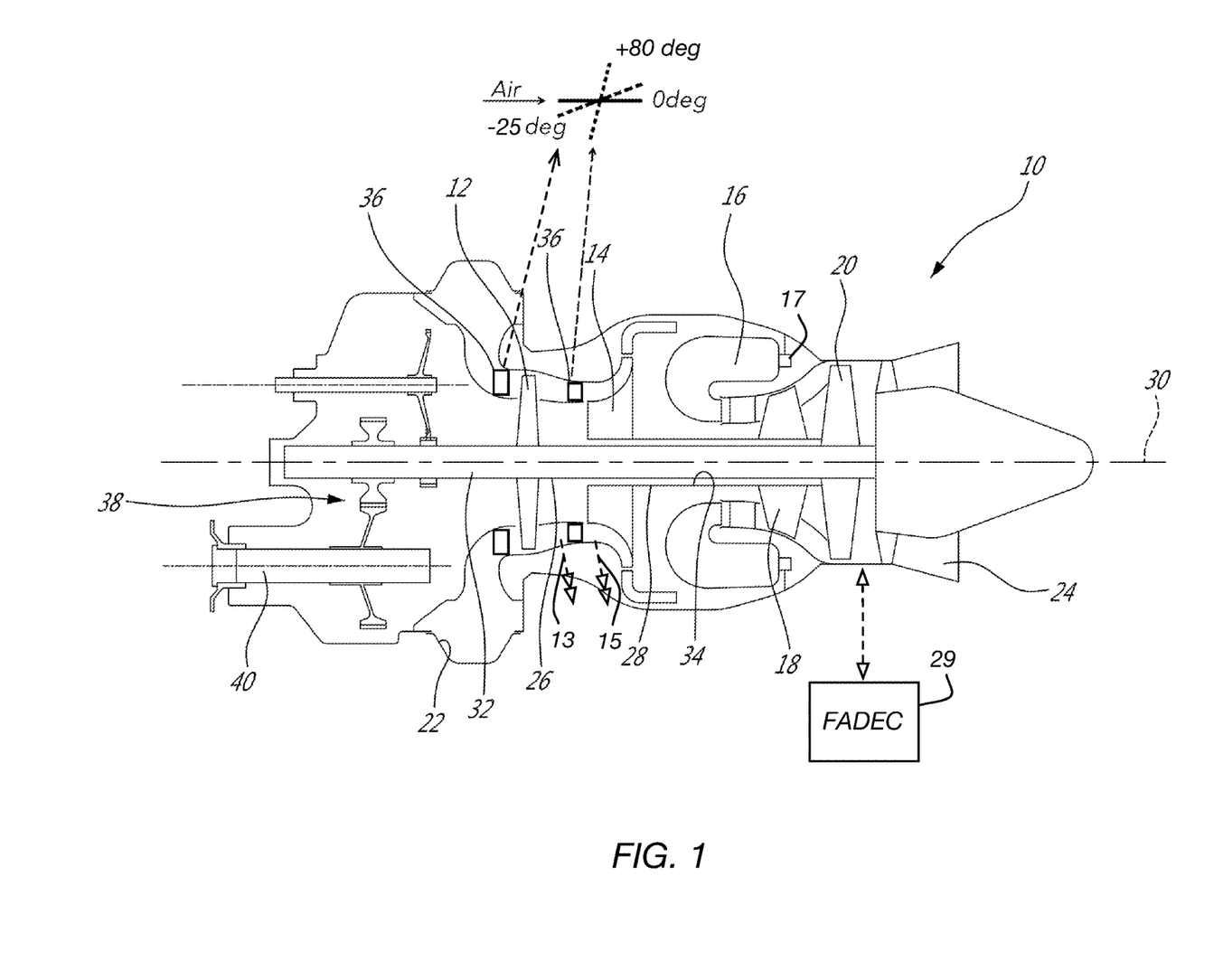
FIG. 1 is a schematic cross-sectional view of a gas turbine engine.

FIG. 1 illustrates a gas turbine engine 10. In this example, the gas turbine 10 is a turboshaft engine generally comprising in serial flow communication a low pressure (LP) compressor section 12 and a high pressure (HP) compressor section 14 for pressurizing air, a combustor 16 in which the compressed air is mixed with a fuel flow, delivered to the combustor 16 via fuel nozzles 17 from fuel system (not depicted), and ignited for generating a stream of hot combustion gases, a high pressure turbine section 18 for extracting energy from the combustion gases and driving the high pressure compressor section 14 via a high pressure shaft 34, and a low pressure turbine section 20 for further extracting energy from the combustion gases and driving the low pressure compressor section 12 via a low pressure shaft 32.

The turboshaft engine 10 may include a transmission 38 driven by the low pressure shaft 32 and driving a rotatable output shaft 40. The transmission 38 may optionally be provided to vary a ratio between rotational speeds of the low pressure shaft 32 and the output shaft 40. (The transmission 38, being optional, is not depicted in the examples shown in FIGS. 2-3B). The compressors and turbines are arranged is low and high pressures spools 26, 28, respectively. In use, suitable one or more controllers 29, such as one or more full authority digital controllers (FADEC) providing full authority digital control of the various relevant parts of the engine 10, controls operation of the engine 10. The FADEC(s) may be provided as for example conventional software and/or hardware, so long as the FADEC(s) is/are configured to perform the various control methods and sequences as described in this document. Each controller 29 may be used to control one or more engines 10 of an aircraft (H). Additionally, in some embodiments the controller(s) 29 may be configured for controlling operation of other elements of the aircraft (H), for instance the main rotor 44.

The low pressure compressor section 12 is configured to independently rotate from the high pressure compressor section 14 by virtues of their mounting on different engine spools. The low pressure compressor section 12 may include one or more compression stages, and the high pressure compressor section 14 may include one or more compression stages. In the embodiment shown in FIG. 1, the low pressure (LP) compressor section 12 includes a single compressor stage 12A, which includes a single mixed flow rotor (MFR), for example such as described in U.S. Pat. No. 6,488,469 B1, entitled "MIXED FLOW AND CENTRIFUGAL COMPRESSOR FOR GAS TURBINE ENGINE", the contents of which are hereby expressly incorporated herein by reference in its entirety.

The LP compressor 12 and the HP compressor 14 are configured to deliver desired respective pressure ratios in use, as will be described further below. The LP compressor 12 may have a bleed valve 13 (shown schematically) which may be configured to selectively bleed air from the LP compressor 12 according to a desired control regime of the engine 10, for example to assist in control of compressor stability. The design of such valve 13 is well known and not described herein in further detail. Any suitable bleed valve arrangement may be used.

As mentioned, the HP compressor section 14 is configured to independently rotate from the LP compressor section 12 by virtue of their mounting on different engine spools. The HP compressor section 14 may include one or more compression stages, such as a single stage, or two or more stages 14A as shown in more detail in FIG. 2. It is contemplated that the HP compressor section 14 may include any suitable type and/or configuration of stages. The HP compressor is configured to deliver a desired pressure ratio in use, as will be described further below. The HP compressor 14 may have a bleed valve 15 (shown schematically) which may be configured to selectively bleed air from the HP compressor section 14 according to a desired control regime of the engine 10, for example to assist in control of compressor stability. The design of such valve 15 is well known and not described herein in further detail. Any suitable bleed valve arrangement may be used.

The turboshaft engine 10 has two or more compression stages 12, 14 to pressurize the air received through an air inlet 22, and corresponding turbine stages 18, 20 which extract energy from the combustion gases before they exit via an exhaust outlet 24. In the illustrated embodiment, the turboshaft engine 10 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors, and need not mean the simple shaft arrangements depicted.

The low pressure spool 26 may include a low pressure shaft 32 interconnecting the low pressure turbine section 20 with the low pressure compressor section 12 to drive rotors of the low pressure compressor section 12. The low pressure compressor section 12 may include at least one low pressure compressor rotor directly drivingly engaged to the low pressure shaft 32, and the low pressure turbine section 20 may include at least one low pressure turbine rotor directly drivingly engaged to the low pressure shaft 32 so as to rotate the low pressure compressor section 12 at a same speed as the low pressure turbine section 20. In other embodiments (not depicted), the low pressure compressor section 12 may be connected via a suitable transmission (not depicted) to run faster or slower (as desired) than the low pressure turbine section 20.

The high pressure spool 28 includes a high pressure shaft 34 interconnecting the high pressure turbine section 18 with the high pressure compressor section 14 to drive rotor(s) of the high pressure compressor section 14. The high pressure compressor section 14 may include at least one high pressure compressor rotor (in this example, two rotors are provided, a MFR compressor 14A and a centrifugal compressor 14B) directly drivingly engaged to the high pressure shaft 34. The high pressure turbine section 18 may include at least one high pressure turbine rotor (in this example there is one HP turbine 18A) directly drivingly engaged to the high pressure shaft 34 so as to drive the high pressure compressor section 14 at a same speed as the high pressure turbine section 18. In some embodiments, the high pressure shaft 34 and the low pressure shaft 32 are concentric, though any suitable shaft and spool arrangement may be employed.

The turboshaft engine 10 may include a set of variable guide vanes (VGVs) 36 upstream of the LP compressor section 12, and may include a set of variable guide vanes (VGVs) 36 upstream of the HP compressor section 14. The first set of variable guide vanes 36A may be provided upstream of the low pressure compressor section 12. A set of variable guide vanes 36B may be provided upstream of the high pressure compressor section 14. The variable guide vanes 36A, 36B may be independently controlled by suitable one or more controllers 29, as described above. The variable guide vanes 36A, 36B may direct inlet air to the corresponding stage of compressor sections 12, 14. The set of variable guide vanes 36A, 36B may be operated to modulate the inlet airflow to the compressors in a manner which allows for improved control of the output power of the turboshaft engines 10, as described in more detail below. The VGVs may be provided with any suitable operating range. In some embodiments, VGV vanes 36B may be configured to be positioned and/or modulated between about +80 degrees and about −25 degrees, with 0 degrees being defined as aligned with the inlet airflow, as depicted schematically in FIG. 1. In a more specific embodiment, the VGV vanes 36A and/or 36B may rotate in a range from +78.5 degrees to −25 degrees, or from +75 degrees to −20 degrees, and more particularly still from 70 degrees to −20 degrees. The two set of VGV vanes 36 may be configured for a similar range of positions, or other suitable position range.

In some embodiments, the set of variable guide vanes 36A upstream of the low pressure compressor section 12 may be mechanically decoupled from the set of variable guide vanes 36B upstream of the high pressure compressor section 14, having no mechanical link between variable guide vanes 36A, 36B to permit independent operation of the respective stages. The VGV vanes 36A, 36B may be operatively controlled by the controller(s) 29 described above, to be operated independently of each other. Indeed, the engines 10A, 10B are also controlled using controller(s) 29 described above, to carry out the methods described in this document. For the purposes of this document, the term "independently" in respects of the VGVs 36 means that the position of one set of the VGV vanes (e.g. 36A) may be set without effecting any change to a position of the other set of the VGV vanes (e.g. 36B), and vice versa.

Independent control of the VGVs 36A, 36B may allow the spools 26, 28 to be operated to reduce or eliminate or reduce aerodynamic coupling between the spools 26, 28. This may permit the spools 26, 28 to be operated at a wider range of speeds than may otherwise be possible. The independent control of the VGV vanes 36A, 36B may allow the spools 26, 28 to be operated at constant speed over a wider operating range, such as from a "standby" speed to a "cruise" power speed, or a higher speed. In some embodiments, independent control of the VGVs 36A, 36B may allow the spools 26, 28 to run at speeds close to maximum power. In some embodiments, independent control of the VGVs 36A, 36B may also allow one of the spools 26, 28 to run at high speed while the other one run at low speed.

In use, the engine 10 is operated by the controller(s) 29 described above to introduce a fuel flow via nozzles 17 to the combustor 16. Combustion gases turn turbine sections 18, 20 which in turn drive the compressor sections 12, 14. The controller(s) 29 control(s) the angular position of VGVs 36A, 36B in accordance with a desired control regime, as will be described further below. The speed of the engine 10 is controlled, at least in part, by the delivery of a desired fuel flow rate to the engine, with a lower fuel flow rate causing the engine 10 to operate at a lower output speed than a higher fuel flow rate.

Such control strategies may allow for a faster "power recovery" of the engine 10 (when an engine is accelerated from a low output speed to a high output speed), possibly because the spools 26, 28 can be affected relatively less by their inherent inertia through the described use of spool 26, 28 speed control using VGVs 26, as will be further described below. In some embodiments, using the vanes VGV 36A, 36B as described herein, in combination with the use of MFR-based low pressure compressor section 12 and/or MFR-based high pressure compressor section 14 may provide relatively more air and/or flow control authority and range through the core of the engine 10, and/or quicker power recovery.

Where MFR compressors 12 and/or 14 of the engines 10A, 10B are provided as described herein, the control of the VGVs 36A and/or VGV 36B provides for improved stability of engine operation. This may be so even where the VGV is operated at an extreme end of its range, such as in the "closed down" position (e.g. at a position of +80 degrees in one embodiment described herein). This control of the VGVs facilitates the ability of the engine to operate at a very low power setting, such as may be associated with a "standby" mode as described further below herein, wherein the compressor of an engine operating in standby mode is operating in a very low flow and/or low pressure ratio regime.

Figure 2:
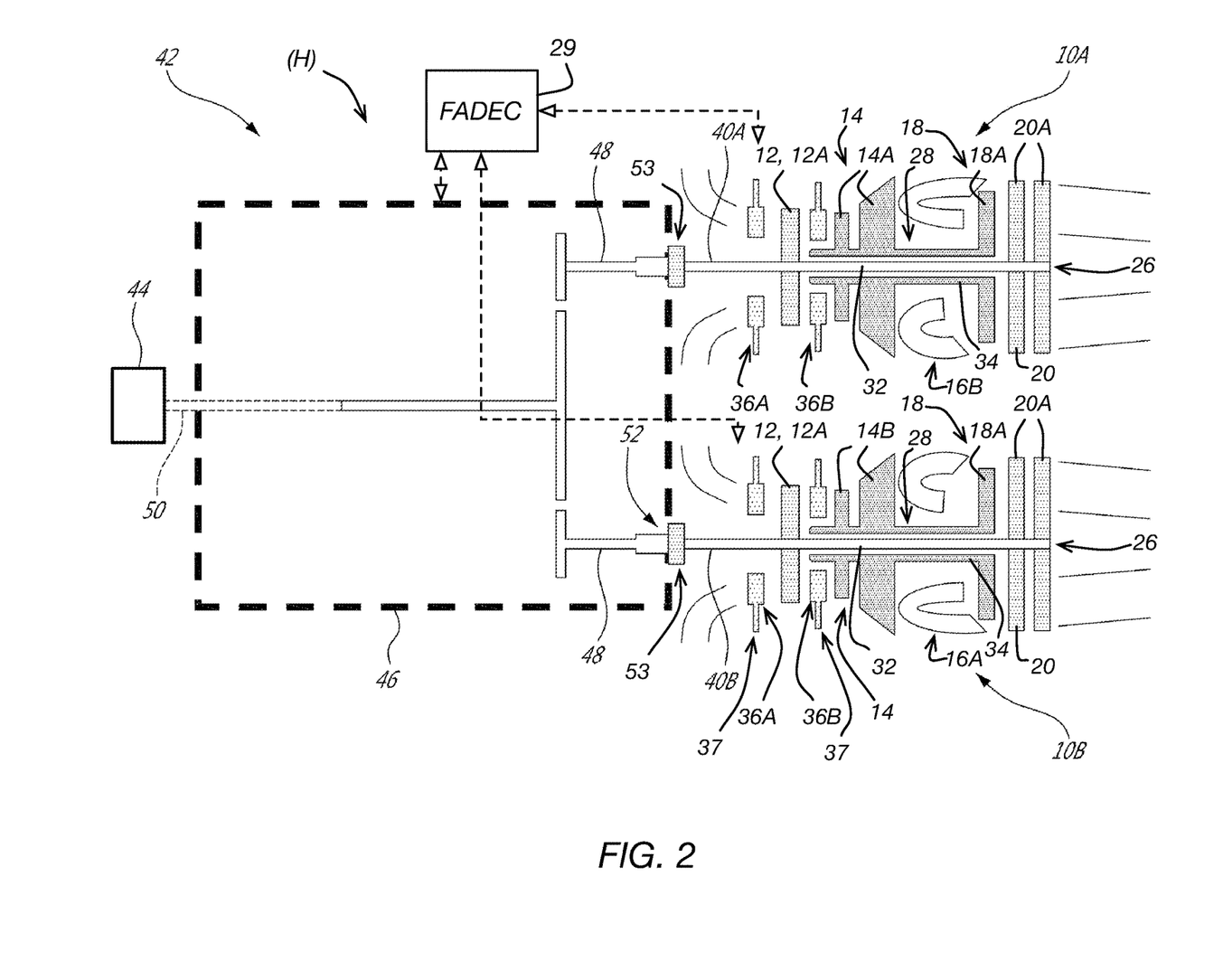
FIG. 2 is a schematic representation of an exemplary multi-engine system, showing two of the FIG. 1 engines.

Turning now to FIG. 2, illustrated is an exemplary multi-engine system 42 that may be used as a power plant for a rotorcraft, such as a helicopter (H). The multi-engine system 42 may include two or more turboshaft engines 10A, 10B. Control of the multi-engine system 42 is effected by one or more controller(s), which may be FADEC(s) 29 as described above, that are programmed to manage, as described herein below, the operation of the engines 10A, 10B to reduce an overall fuel burn, particularly during sustained cruise operating regimes, wherein the helicopter is operated at a sustained (steady-state) cruising speed and altitude. The cruise operating regime is typically associated with the operation of prior art engines at equivalent part-power, such that each engine contributes approximately equally to the output power of the system 42. However, in the present description, while the helicopter condition (cruise speed and altitude) maybe substantially the same, the engines 10A, 10B of the system 42 are instead operated asymmetrically, with one engine operated ay high-power "active" more and the other engine operated in a low-power "standby" mode. As will be described, doing so may operate fuel saving opportunities to the helicopter, however there may be other suitable reasons why the engines are desired to be operated asymmetrically. This operation management may therefore be referred to as a "asymmetric mode", wherein one of the two engines is operated in a low-power "standby mode" while the other engine is operated in a high-power "active" mode power. In such an asymmetric mode, which may be engaged during a helicopter cruise phase of flight (continuous, steady-state flight which is typically at a given commanded constant helicopter cruising speed and altitude) The multi-engine system 42 may be used in an aircraft, such as a helicopter as described, but also has applications in suitable marine and/or industrial applications.

Referring still to FIG. 2, the multi-engine system 42 may include a first turboshaft engine 10A and a second turboshaft engine 10B configured to drive a common load 44. In some embodiments, the common load 44 may comprise a rotary wing of a rotary-wing aircraft. For example, the common load 44 may be a main rotor of the helicopter. Depending on the type of the common load 44 and on the operating speed thereof, turboshaft engines 10A, 10B may be drivingly coupled to the common load 44 via a gearbox 46, which may be any suitable type, such as a speed-changing (e.g., reducing) type.

The gearbox 46 may have a plurality of transmission shafts 48 to receive mechanical energy from respective output shafts 40A, 40B of respective turboshaft engines 10A, 10B to direct at least some of the combined mechanical energy from the plurality of the turboshaft engines 10A, 10B to a common output shaft 50 for driving the common load 44 at a suitable operating (e.g., rotational) speed. The multi-engine system 42 may include a transmission 52 driven by the output shaft 40B and driving the rotatable transmission shaft 48. The transmission 52 may be controlled to vary a ratio between the rotational speeds of the respective output shaft 40A/40B and transmission shaft 48.

The multi-engine system 42 may be configured, for example, to drive accessories of an associated aircraft in addition to the main rotor. The gearbox 46 may be configured to permit the common load 44 to be driven by either the first turboshaft engine 10A or the second turboshaft engine 10B, or, by a combination of both the first turboshaft engine 10A and the second turboshaft engine together 10B. A clutch 53 may be provided to permit each engine 10A, 10B to be engaged and disengaged with the transmission X, as desired. For example, an engine 10A, 10B running at low- or no-power conditions may be declutched from the transmission if desired. In some embodiments, a conventional clutch may be used.

In normal operation, the engines 10A and 10B are controlled by the controller(s) 29 to introduce a fuel flow via nozzles (not shown in FIG. 2, may be similar to fuel nozzles 17 in FIG. 1) to the combustors 16A, 16B. Combustion gases turn turbine sections 18. 20 which in turn drive compressor sections 12, 14. The controller(s) 29 control(s) the angular position of VGVs 36A, 36B of each engine 10A, 10B in accordance with a desired control regime, as will be described further below. The speed of the engines 10A, 10B is controlled, at least in part, by the delivery of a desired fuel flow rate to each engine.

According to the present description, the multi-engine system 42 driving a helicopter (H) may be operated in an asymmetric mode, in a first of the turboshaft engines (say, 10A) may be operated at high power in an active mode and the second of the turboshaft engine (10B in this example) may be operated in a low-power standby mode. For example, the first turboshaft engine 10A may be operated by the FADEC to run at full (or near-full) power conditions in the active mode, to supply substantially all or all of a required power and/or speed demand of the common load 44. The second turboshaft engine 10B may be operated by the controller(s) 29 to run at low-power or no-output-power conditions to supply substantially none or none of a required power and/or speed demand of the common load 44. The selection of which engine is active standby modes, respectively, may be as desired, and may be fixed for a given aircraft or a given flight, or may alternate between engines 10A, 10B during a flight or in successive flights.

As discussed above, asymmetric operation regime of the engines in ICR mode may be achieved through differential control of fuel flow to the engines, and corresponding control of their VGVs 36.

Figure 4:
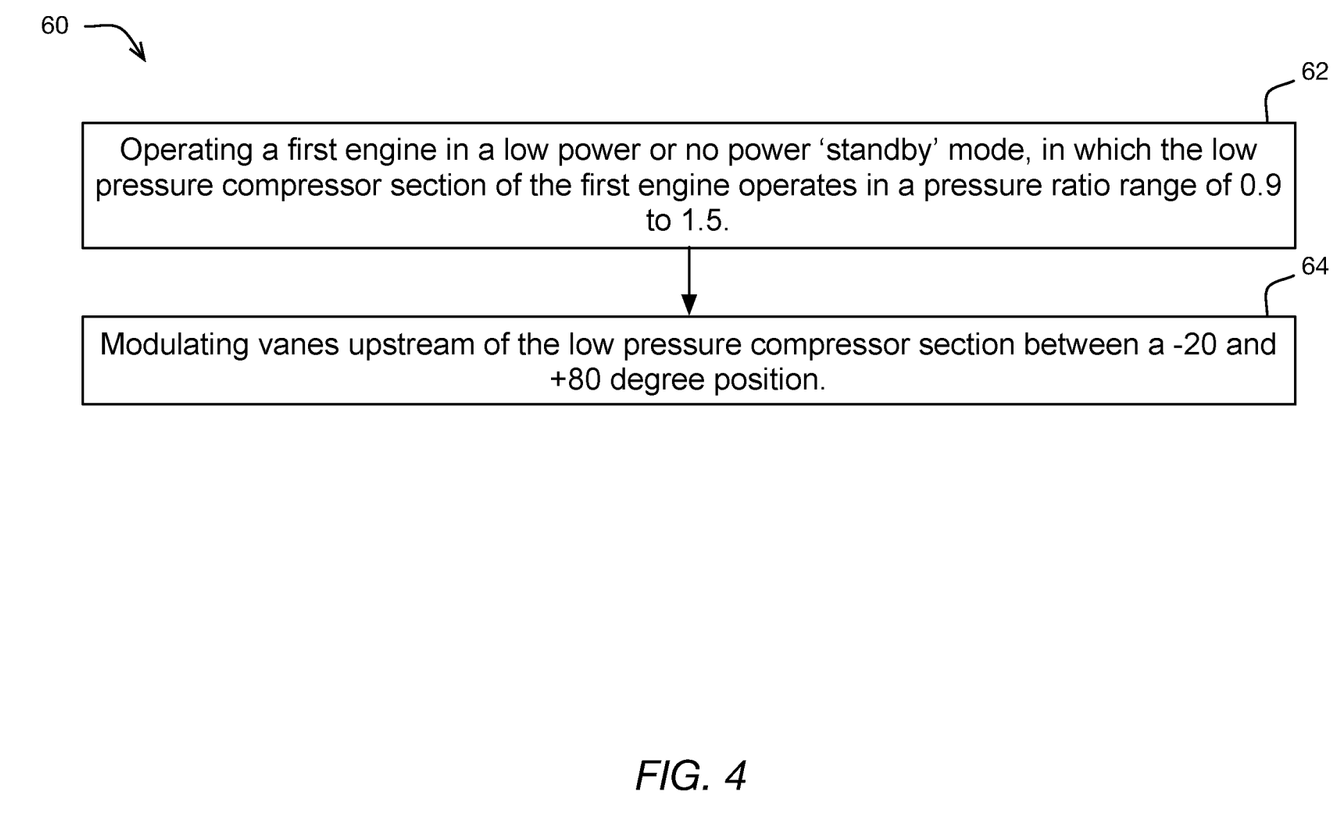
FIG. 4 is a flowchart showing a method of operating a multi-engine helicopter.

As a non-limiting example, and referring to FIG. 4, a method 60 for controlling a multi-engine system 42 may include step 62, which may include operating an engine in a low power (or no power) "standby" mode in which the low pressure compressor section 12 operates within a pressure ratio range of 0.9 to 2.5, and in some embodiments within a pressure ratio range of 0.9 to 1.5, at constant speed, while performing a step 64 of modulating the vanes 36A upstream thereof according to an appropriate schedule. One such schedule may, for example, include modulating the VGV 36A between a −25 and +80 degree position, and in some embodiments between a −20 and +70 degree position, and may include a high closure angle (e.g. +50 to +80 degree position) for VGV 36A during operation in the lower pressure ratio regime of operation at a pressure ratio of 0.9 to 2.5, or in some embodiments of 0.9 to 1.5. In some such embodiments, the VGV 36B of the HP compressor section 14 may be modulated between a −25 and +80 degree position, and in some embodiments between a −20 and +50 degree position. As used here, the term "constant speed" means within +/−1% of a target speed, or within a desired speed range.

As another non-limiting example, the method 60 for controlling a multi-engine system 42 may include steps of: operating a first engine in a low power (or no power) "standby" mode in which the low pressure compressor section 12 within a pressure ratio range of 1.0 to 1.7 at constant speed, while modulating the vanes 36A upstream thereof according to an appropriate schedule. One such schedule may include a modulation range of −25 to +80 degrees, including a high closure angle (e.g. +50 to +80 degree position) for VGVs 36A, and in some such embodiments a similar range for VGVs 36B, during operation in the low pressure ratio regime of 1.0 to 1.7. In some such embodiments, the VGVs 36B may be suitably modulated between a −25 degree position and a +70 degree position. In some such embodiments, the VGVs 36B may be suitably modulated between a −20 degree position and a +50 degree position.

VGV vane scheduling may be any suitable scheduling across the operating range. In some embodiments, the VGV vane 36 position may be linearly mapped over the pressure range.

In some embodiments, the multi-engine system 42 may allow a standby engine 10 (10A or 10B) to be operated in a sustained (i.e. continuous, steady-state) reduced power mode at fuel flows in a range of about 30% down to about 12% of a "reference fuel flow" through the engine 10. The reference fuel flow may, for example, be a take-off fuel flow of the engine, or a cruise fuel flow of the engine.

In some embodiments, the airflow control authority and/or control using the VGV(s) 36 according to the described examples may allow the engine 10 to operate in a sustained (i.e. continuous, steady-state) reduced power (or in some examples materially no output power) mode at fuel flows in a range of about 20% down to about 10% of a reference fuel flow to the engine 10.

In some embodiments, the airflow control authority and/or control using the VGV(s) 36 according to the described examples may allow a reduction in the size of the bleed valve(s), for example bleed valve(s) 13, 15 (FIG. 1), that may be associated with the compressor sections 12 and/or 14, as the control regime allows for improved stability with different bleed requirements relative to a prior art system. In some embodiments, 15-20% less compressor handling bleed flow through associated handling bleed valve(s) may be required.

In some embodiments, the airflow control authority and/or control using the VGV(s) 36 according to the described examples may allow a given engine 10 to be operated to with a higher HP compressor 14 speed than would otherwise be available, because a decrease in the pressure ratio and mass flow at a given speed through the HP VGV 36B and LP compressor stage 12. The control regimes described herein may allow for a more rapid increase in output engine power, and a higher acceleration rate of the HP compressor 14 from a lower speed, such as may be used in an ICR mode when the engine is in the standby mode, and may do so without assistance from an external power source such as an engine starter or other device for imparting power to the engine for HP spool acceleration.

In some embodiments, the airflow control authority and/or control using the VGV(s) 36 according to the described examples may allow a 2 stage high pressure compressor section 14 to operate at about 17-25% of its pressure ratio at design point during some standby modes, and at 40-60% corrected speed of its design point during some standby modes, through use of the described VGV 36 control.

It is understood that a single engine system such as shown in FIG. 1 may be operated with advantage in a low power regime, without the context of a multi-engine ICR mode. For example, a very low speed "sub-idle" or "standby" operation of a single-engine system may also be desirable in some circumstances, such as on the ground.

The standby condition may be affected by operating the engine (via the controller(s) 29) at lower power conditions and/or at low fuel flow conditions. An engine run at high power and the other operated at lower power may operate more efficiently than two engines operated at 50% power for a given desired power output. Potentially the present asymmetric operation method may reduce an overall fuel consumption of the system 42, as compared to operating a conventional twin engine wherein each engine is operating at 50% power.

In use, the first turboshaft engine (say 10A) may operate in the active mode while the other turboshaft engine (say 10B) may operate in the standby mode, as described above. During this asymmetric operation, if the helicopter (H) needs a power increase (expected or otherwise), the second turboshaft engine 10B may be required to provide more power relative to the low power conditions of the standby mode, and possibly return immediately to a high- or full-power condition. This may occur, for example, in an emergency condition of the multi-engine system 42 powering the helicopter, wherein the "active" engine loses power the power recovery from the lower power to the high power may take some time. Even absent an emergency, it will be desirable to repower the standby engine to exit the asymmetric mode.

In general, a response time for power recovery from the standby mode to a higher-power normal operational mode may be reduced with the current engine design, because the use of MFR compressor(s) in comparison to typical prior art axial rotors, and/or because the use of a "split compression" arrangement with compression stages split between the LP and HP spools, results in a lower mass and inertia on each spool of the turboshaft engine 10 relative to a conventional turboshaft engine. As a result, the response time engine 10/10A/10B may be reduced relative to a typical prior art engine configuration (axial compression staged driven only by the HP spool). For example, in comparison with a baseline turboshaft engine having a compressor on the HP spool and delivering a same power as the turboshaft engine 10/10A/10B, the mass/inertia of each spool 26, 28 of the turboshaft engine 10/10A/10B may be lower than the corresponding mass/inertia of the baseline turboshaft engine.

The lower relative mass/inertia may make the turboshaft engine 10 more reactive to power or rotor speed demands in comparison to said baseline engine. The turboshaft engine 10/10A/10B may have faster acceleration to full power, which may be useful when operating the engine to recover from the standby mode to a higher-power mode, such as normal engine operating mode. Although the described and depicted embodiments of the multi-engine system 42 have identical engines 10/10A/10B, any suitable engine arrangement or combination may be employed and may include, in an example embodiment (not shown), one said baseline turboshaft engine and one turboshaft engine 10/10A/10B according to the present invention.

For example, in comparison with a baseline turboshaft engine having a single compressor spool and delivering a same power as the turboshaft engine 10, the mass of inertia of each spool 26, 28 of the turboshaft engine 10 implemented according to the architecture of the present technology may be lower than the mass of inertia of the single compressor spool of the baseline turboshaft engine. A lower mass of inertia may make the turboshaft engine 10 more reactive to power or rotor speed demands. The turboshaft engine 10 may have faster acceleration to full power from the standby mode relative to the baseline turboshaft engine. In some embodiments, the multi-engine system 42 may include the baseline turboshaft instead of the first turboshaft engine 10A.

Figure 3A:
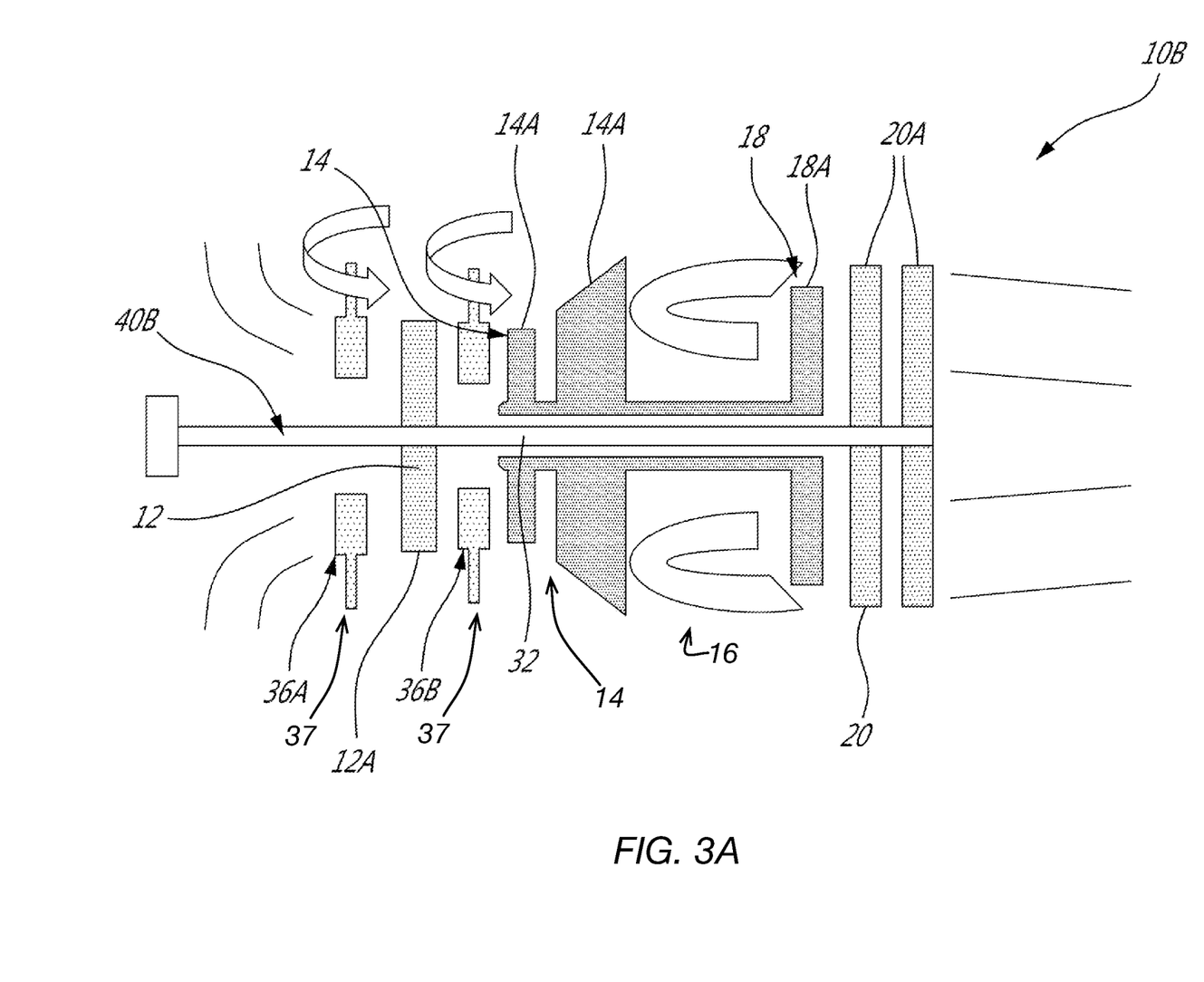
FIG. 3A is a schematic representation of one of the engines of FIG. 2.

Referring to FIG. 3A, a schematic representation of the second turboshaft engine 10B is shown. The turboshaft engine 10B includes a first set of variable guide vanes 36A disposed at the inlet of the low pressure compressor section 12. That is, the first set of variable guide vanes 36A are located upstream of the low pressure compressor section 12 relative to the direction of airflow through the turboshaft engine 10B. The first set of variable guide vanes 36A may be configured to control the operating condition of the low pressure spool 26. The turboshaft engine 10B includes a second set of VGVs 36B disposed at the inlet of the high pressure compressor section 14. The second set of VGVs 36B are located upstream of the high pressure compressor section 14 relative to the direction of airflow through the turboshaft engine 10B. The second set of VGVs 36B may be configured to control the operating condition of the high pressure spool 28. VGVs 36A, 36B have respective actuation mechanisms 37, which may be any suitable actuation mechanisms depending on the configuration of the VGVs 36A, 36B and the rest of the engine 10, and more particularly may be selected to provide for the modulation and range functionality of the VGVs 36A, 36B as described herein.

The low pressure compressor section 12 may include one or more compression stages driven by one or more turbine stages of the low pressure turbine section 20. For example, in the embodiment shown in FIG. 3A, the low pressure compressor section 12 includes a single compressor stage 12A of a mixed flow rotor (MFR) and the low pressure turbine section 20 includes two power turbine stages 20A. In another example, the low pressure compressor section 12 may include two compressor stages. The two compressor stages may include two axial compressors, or a single axial or centrifugal stage as another example. The low pressure turbine section 20 may include three turbine stages. The output shaft 40B may be directly coupled to the low pressure shaft 32.

The high pressure compressor section 14 may include one or more compression stages, or a single centrifugal stage, driven by one or more turbine stages of the high pressure turbine section 18. For example, in the embodiment shown in FIG. 3A, the high pressure compressor section 14 includes two compressor stages 14A including a mixed flow rotor (MFR) and a centrifugal impeller, and the high pressure turbine section 18 includes a single power turbine stage 18A. The two compressor stages 14A may include two centrifugal impellers. In another example, the high pressure compressor section 14 may include three compressor stages. The three compressor stages may include two axial compressors and one centrifugal impeller. The high pressure turbine section 18 may include two turbine stages.

Figure 3B:
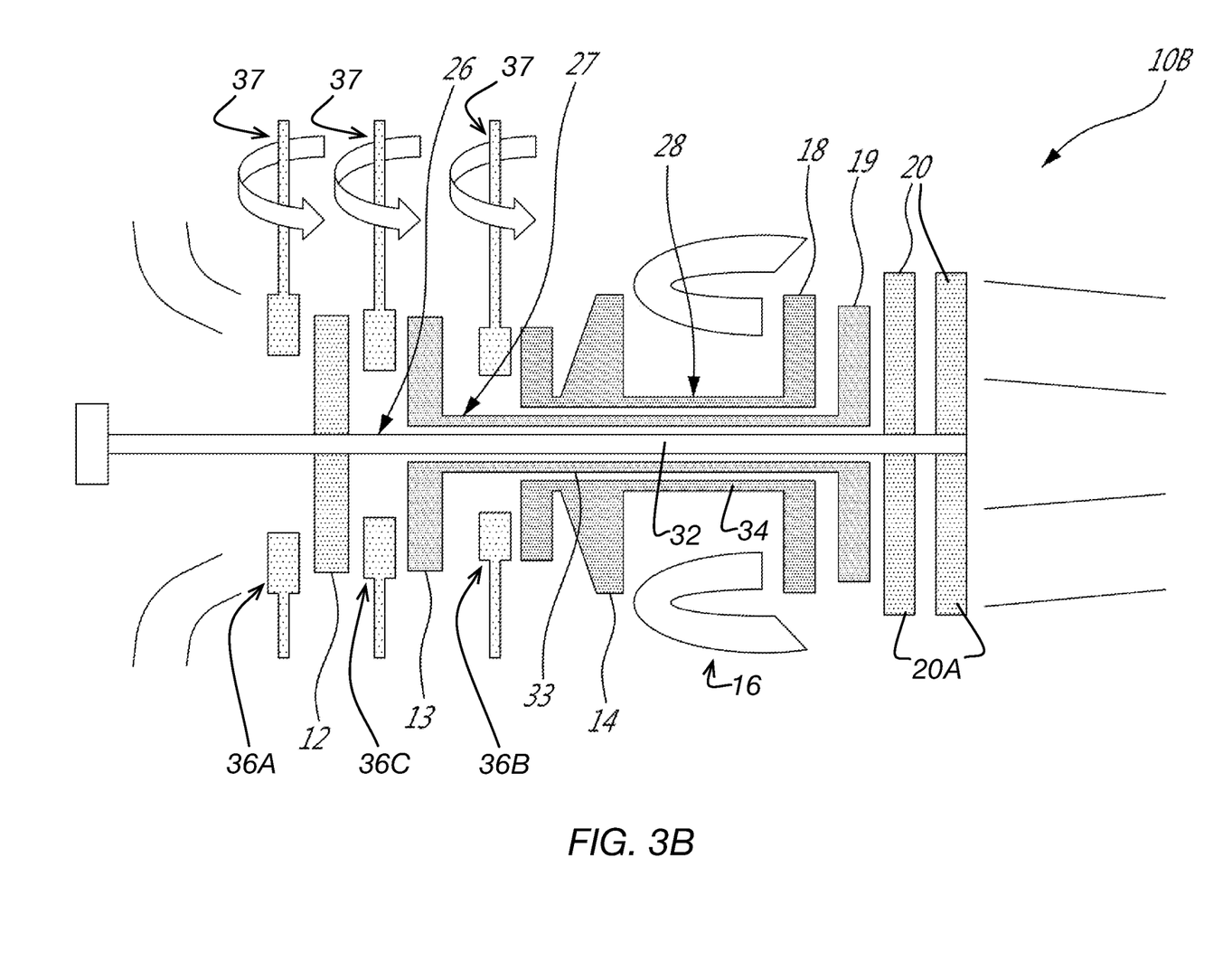
FIG. 3B is a schematic representation of one of the engines of FIG. 2 in accordance to another example embodiment.

Referring to FIG. 3B, a schematic representation of the second turboshaft engine 10B is shown in accordance to another exemplary representation. The turboshaft engine 10B may have three or more power spools, with corresponding three or more VGV sets 36A, 36B, 36C at the air inlet to the respective compressor sections of each of the three or more power spools. The additional one or more VGV sets 36C may be similar to the VGV sets 36A and 36B as described herein. In such embodiments, each of the three or more VGV sets 36A, 36B, 36C may be decoupled from the rest of the three or more VGV sets 36A, 36B, 36C and hence may be modulated between, for example −25 and +85 degree positions, while the rest of the three or more VGV sets 36A, 36B, 36C are in a given position for example. In the embodiment shown in FIG. 3B, the turboshaft engine includes an intermediate pressure spool 27. The intermediate pressure spool 27 includes an intermediate pressure shaft 33 interconnecting an intermediate pressure turbine section 19 with an intermediate pressure compressor section 13 to drive rotors of the intermediate pressure compressor section 13. The intermediate pressure compressor section 13 may include at least one intermediate pressure compressor rotor directly drivingly engaged to the intermediate pressure shaft 33 and the intermediate pressure turbine section 19 may include at least one intermediate pressure turbine rotor directly drivingly engaged to the intermediate pressure shaft 33 so as to rotate the intermediate pressure compressor section 13 at a same speed as the intermediate pressure turbine section 19. In other embodiments of the engine 10B, there may be no compressor on the low pressure spool 26.

Figure 5:
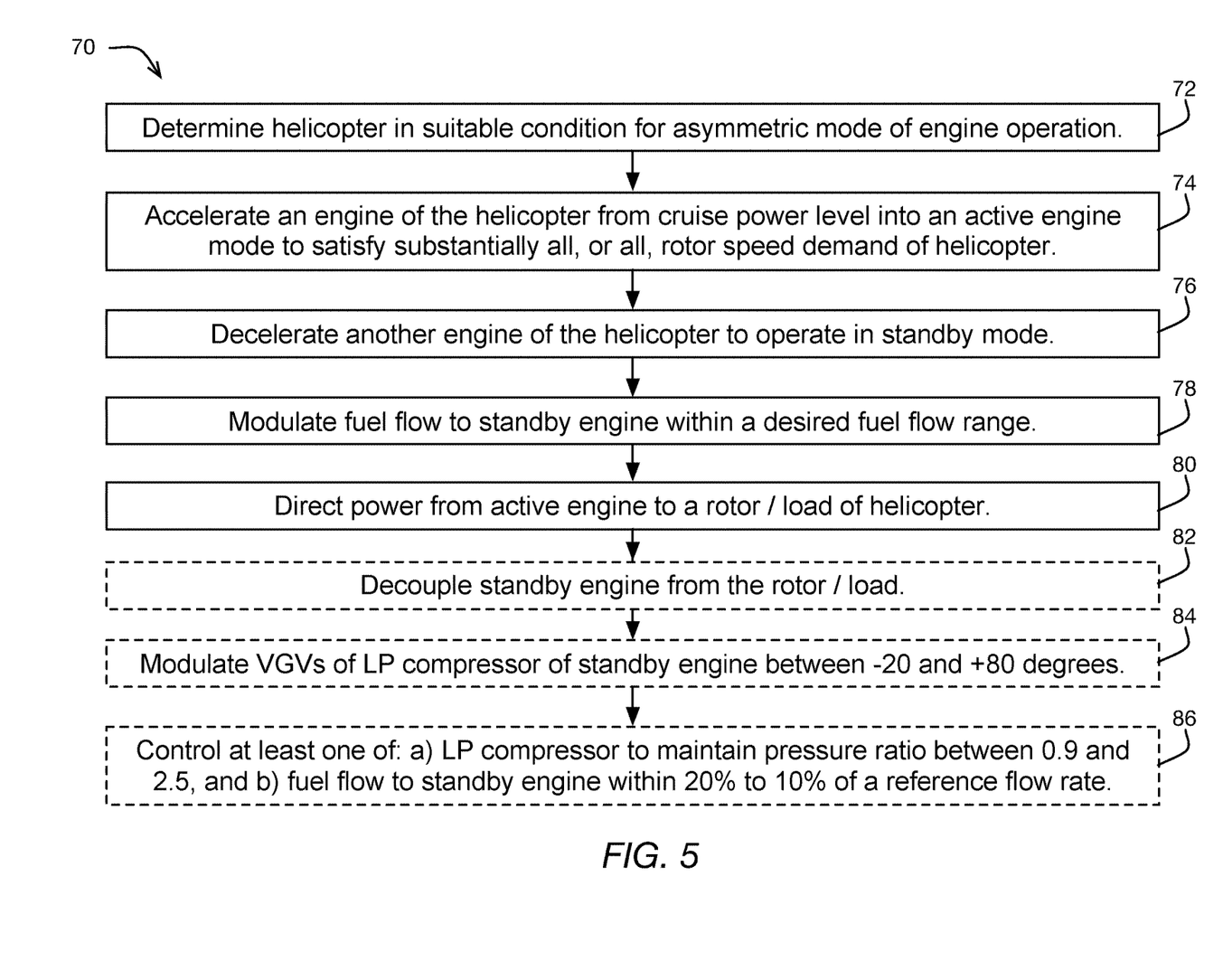
FIG. 5 is a flowchart showing a method of operating a multi-engine system of a helicopter.

Referring now to FIG. 5, the present description provides for a method 70 of operating a multi-engine system 42 of a rotorcraft, such as helicopter (H). The method 70 may be used for example to operate the multi-engine engine system 42 during, in one example, a cruise flight segment which may be described as a continuous, steady-state flight segment which is typically at a relatively constant cruising speed and altitude. In a typical cruise mode, both engines provide ~50% of the cruise power demand of the helicopter (H). This power level of each engine (~50% of total power required by the helicopter) is referred to herein as a "cruise power level".

The method 70 may include a step 72, using an engine controller 29, such as a full authority digital control (FADEC) 29 to control the engines 10A, 10B to operate asymmetrically. At step 72, the FADEC 29 may determine that the helicopter (H) is in a suitable condition for entering asymmetric mode. In step 74, the FADEC 29 may accelerate one engine (say 10A) of the multiengine system 42 from a cruise power level into an active engine mode, in which the first engine may provide a higher cruise power level and sufficient power to satisfy substantially all or all (90% or higher) of a helicopter power or rotor speed demand. At step 76, the FADEC 29 may decelerate another engine (say 10B) of the multiengine system 42 to operate in a standby mode at a power substantially lower than cruise power level, and in some embodiments at zero output power and in other embodiments less than 10% output power relative to a reference power (provided at a reference fuel flow).

To effect such control, the FADEC 29 may correspondingly control fuel flow rate to each engine 10A, 10B accordingly. In the case of the standby engine, a fuel flow (and/or a fuel flow rate) provided to the standby engine is controlled to be between 70% and 99.5% less than the fuel flow (and/or the fuel flow rate) provided to the active engine. In the asymmetric mode, the standby engine may be maintained between 70% and 99.5% less than the fuel flow to the active engine. In some embodiments of the method 60, the fuel flow rate difference between the active and standby engines may be controlled to be in a range of 70% and 90% of each other, with fuel flow to the standby engine being 70% to 90% less than the active engine. In some embodiments of the method 60, the fuel flow rate difference may be controlled to be in a range of 80% and 90%, with fuel flow to the standby engine being 80% to 90% less than the active engine.

According to Step 78 in FIG. 5, once in the asymmetric mode, the FADEC 29 may monitor and modulate fuel flow to the standby engine and/or the active engine to keep the standby engine within the desired fuel flow range. Although the desired target points for fuel flow herein are described relative to the fuel flow of the other engine, in practice the actual target fuel flow ranges for the engines may be set and managed by the FADEC 29 using any suitable approach, such as to targets defined during design and development of the engine, rather than based on real time or other data from the operation of the other engine. In some embodiments, the standby engines (say 10B) may be controlled (closed loop) by using the target fuel flow rate as a control input variable to FADEC 29. In some embodiments, the active engine (say 10A) which is providing all or substantially all of the power/rotor speed demand of the helicopter 42 may be controlled by using any suitable method, such as controlling (closed loop) on power, or rotor speed demand of the helicopter or other suitable control variable as the (or one of the) control input variable(s) for the active engines.

Alternately, in some embodiments, the step of controlling the active engine(s) may include controlling the standby engine at a power in a range of 0% to 1% of a rated full-power of the standby engine. In such an embodiment, the standby engine (say 10B) may be controlled (closed loop) by using the target output power of the engine.

In some embodiments of the method, the step 78 of controlling the active engine may include the step 80 (as shown in FIG. 5) of directing output power from the active engine to drive a rotor 44/load 44 of the multi-engine helicopter (H) via a gearbox 46 of the multi-engine helicopter (H). As shown in step 82 of FIG. 5, optionally, the standby engine may be decoupled from the gearbox 46, either actively by the FADEC 29 or passively by virtue of the clutch X design. For example, the gearbox 46 may be configured to decouple a given engine when that engine power/speed drops below a given power/speed threshold. In some embodiments, conventional helicopter gearbox technology may be used to configure the gearbox 46 this way.

In some embodiments, the controlling the active engine(s) may include controlling the active engine(s) to drive the rotor/load 44 via the gearbox 46 and controlling the fuel flow rate difference so as to drive the gearbox 46 with the standby engine(s) at a power in a range of 0% to 1% of a rated full-power of the standby engine(s).

In some embodiments, maintaining the fuel flows as described in an engine having the described combination of the MFR(s) 12, 14 and of independently modulated VGV sets 36A, 36B, or combination thereof as described above, may provide further improvements over prior art multi-engine operating regimes.

Referring again to FIG. 5, the method 70 may include a step 84 of modulating the VGVs 36A upstream of a low pressure compressor section 12 of the standby engine between a +80 degree position and a −25 degree position (or optionally, between a +75 degree and −25 degree position) independently of a position of the VGVs 36B upstream of a high pressure compressor section 14 of the active engine.

Referring still to FIG. 5, the method 70 may include a step 86 of performing at least one of: a) controlling the low pressure compressor section 12 of the standby engine to maintain a pressure ratio associated with the low pressure compressor section 12 between 0.9 to 2.5, and in some embodiments between 0.9 and 1.5, and b) controlling a fuel flow to the standby engine with the range of about 20% to 10% of a selected reference fuel flow (e.g. cruise or take-off fuel flow) to the standby engine(s). In some embodiments, the method 70 may include modulating the VGVs 36B of the HP compressor section 14 to suit each particular embodiment of the engine and each particular control sequence of the VGVs 36A for example. As a non-limiting example, in some embodiments, the VGVs 36B may be modulated between −25 and +80 degree positions during modulation of the VGVs 36A and fuel flow control, and in some embodiments between −25 and +50 degree positions.

In some embodiments, the method 70 may include modulating the VGVs 36A and/or 36B of the active engine(s) and/or fuel flow to the active engine(s) to suit the particular embodiment(s) and operating conditions of the active engine(s) which may operate simultaneously with the standby engine(s).

The above description is meant to be exemplary only, and one skilled in the art will recognize that changes may be made to the embodiments described without departing from the scope of the invention disclosed. For example, the compressor rotor may comprise any suitable design, and need not include MFR rotors but rather may employ axial compressor stage(s) and/or centrifugal impeller stages also or instead. The multi-engine system may have more than two turboshaft engines, in which case any suitable number of the engines may operate in the active and standby modes, respectively.

While the description focuses on a helicopter (H), it may be applied to other types of multi-engine aircraft or power systems, such as marine and industrial power systems. The number, nature and configuration of VGV vane may be any suitable. The engine controller may be any suitable, and the methods of effecting engine control also do not form any part of this description other than as expressly provided. Although described with regard to a helicopter, the description applies to any suitable rotorcraft. Still other modifications which fall within the scope of the present invention will be apparent to those skilled in the art, in light of a review of this disclosure.

The invention claimed is:

1. A turboshaft engine for a rotorcraft, the turboshaft engine comprising:
a first spool having a low pressure compressor in fluid communication with an air inlet, a first set of variable guide vanes disposed at an entry of the low pressure compressor, and a low pressure turbine drivingly engaged to the low pressure compressor;
a second spool independently rotatable relative to the first spool, the second spool having a high pressure compressor in fluid communication with the low pressure compressor to receive pressurized air therefrom, a second set of variable guide vanes disposed at an entry of the high pressure compressor, the second set of variable guide vanes independently operable relative to the first set of variable guide vanes, and a high pressure turbine drivingly engaged to the high pressure compressor; and an output shaft drivingly engaged to the low pressure turbine, the output drive shaft adapted to drivingly engage a rotatable load of the turboshaft engine;

wherein both of the low pressure compressor and the high pressure compressor include a mixed flow rotor.

2. The turboshaft engine as defined in claim 1, wherein the mixed flow rotor in one or both of the low pressure compressor and the high pressure compressor is located immediately downstream of a respective one of the first set of variable guide vanes and the second set of variable guide vanes.

3. The turboshaft engine as defined in claim 1, wherein the first set of variable guide vanes is operable between an 80 degree position and a −25 degree position associated with the first set of variable guide vanes.

4. The turboshaft engine as defined in claim 3, wherein the second set of variable guide vanes is operable between an 80 degree position and a −25 degree position associated with the second set of variable guide vanes.

5. The turboshaft engine as defined in claim 1, wherein the first set of variable guide vanes is operable between an 80 degree position and a −25 degree position associated with the first set of variable guide vanes while the second set of variable guide vanes is maintained in a given position.

6. The turboshaft engine as defined in claim 1, wherein the high pressure turbine includes only a single turbine stage.

7. The turboshaft engine as defined in claim 1, wherein the low pressure compressor includes only the single mixed flow rotor.

8. The turboshaft engine as defined in claim 1, wherein the high pressure compressor includes a centrifugal compressor.

9. A turboshaft engine for a rotorcraft, the turboshaft engine comprising:

at least two spools independently rotatable relative to each other, a low pressure spool of the at least two spools including a low pressure shaft interconnecting a low pressure compressor section to a low pressure turbine section, and a high pressure spool of the at least two spools including a high pressure shaft interconnecting a high pressure compressor section to a high pressure turbine section, both of the low pressure compressor section and the high pressure compressor section including a mixed flow rotor; and means for controlling an airflow through the low pressure compressor section independently of the high pressure compressor section.

10. The turboshaft engine as defined in claim 9, wherein said means for controlling including means for independently operating a first set of variable guide vanes and a second set of variable guide vanes.

11. The turboshaft engine as defined in claim 10, wherein the first set of variable guide vanes is disposed upstream of the low pressure compressor section and the second set of variable guide vanes is disposed upstream of the high pressure compressor, vanes of the first set of variable guide vanes being moveable independently from vanes of the second set of variable guide vanes.

12. The turboshaft engine as defined in claim 9, wherein said means is configured to modulate the first set of variable guide vanes between an 80 degree position and a −25 degree position.

13. The turboshaft engine as defined in claim 12, wherein said means is configured to modulate the second set of variable guide vanes between an 80 degree position and a −25 degree position.

14. The turboshaft engine as defined in claim 9, wherein the low pressure compressor includes only the single mixed flow rotor.

15. The turboshaft engine as defined in claim 9, wherein the high pressure compressor includes a centrifugal compressor.

16. A method for operating a turboshaft engine for a rotorcraft, the method comprising:

drawing air into a core of the turboshaft engine through a low pressure compressor section and then through a high pressure compressor section located downstream from the low pressure compressor section to provide pressurized air, the low pressure compressor section rotating independently of the high pressure compressor section, both of the low pressure compressor section and the high pressure compressor section including a mixed flow rotor;

operating a first set of variable guide vanes disposed upstream of the low pressure compressor section;

independently of operating the first set of variable guide vanes, operating a second set of variable guide vanes disposed upstream of the high pressure compressor;

igniting a mixture of the pressurized air and fuel to generate combustion gases;

directing the combustion gases through a high pressure turbine section and then through a low pressure turbine section to drive the high pressure turbine section and the low pressure turbine section using the combustion gases;

driving the high pressure compressor section with the high pressure turbine section; and driving the low pressure compressor section and a rotatable load with the low pressure turbine section, the low pressure turbine section and the high pressure turbine section rotating independently from one another.

17. The method as defined in claim 16, wherein operating the first set of variable guide vanes includes modulating the first set of variable guide vanes between one of: an 80 degree position and a −25 degree position; a 75 degree position and a −20 degree position.

18. The method as defined in claim 17, wherein operating the second set of variable guide vanes includes one of: modulating the second set of variable guide vanes between an 80 degree position and a −25 degree position; and maintaining the second set of variable guide vanes in a given position.

19. The method as defined in claim 16, wherein drawing air through the low pressure compressor section includes drawing air through the single mixed flow rotor in the low pressure compressor section.

20. The method as defined in claim 16, wherein drawing air through the high pressure compressor section includes drawing air through a centrifugal compressor in the high pressure compressor section.

* * * * *